United States Patent [19]

van Poorten

[11] Patent Number: 4,946,092
[45] Date of Patent: Aug. 7, 1990

[54] METHOD FOR ARRANGING A THROUGH-CHANNEL IN A SOLID BODY, AND THE BODY OBTAINED WITH THIS METHOD

[75] Inventor: Antonius van Poorten, Deurne, Netherlands

[73] Assignee: Nagron Precision Tooling B.V., Netherlands

[21] Appl. No.: 336,084

[22] Filed: Apr. 11, 1989

[51] Int. Cl.⁵ .................... B23P 15/00; B29C 45/27
[52] U.S. Cl. .................................... 228/162; 29/463; 228/174; 51/317
[58] Field of Search ............... 51/2, 317; 228/170, 228/174, 162; 29/463

[56] References Cited

U.S. PATENT DOCUMENTS

| | | | |
|---|---|---|---|
| 3,039,234 | 6/1962 | Balman | 51/2 R |
| 4,609,138 | 9/1986 | Harrison | 228/174 X |

FOREIGN PATENT DOCUMENTS

| | | |
|---|---|---|
| 197181 | 10/1986 | European Pat. Off. |
| 838710 | 5/1952 | Fed. Rep. of Germany |
| 2238569 | 2/1975 | France |
| 518326 | 7/1976 | U.S.S.R. ............... 51/317 |
| 87-5552 | 9/1987 | World Int. Prop. O. |

*Primary Examiner*—Kenneth J. Ramsey
*Attorney, Agent, or Firm*—Watson, Cole, Grindle & Watson

[57] ABSTRACT

A method for arranging at least one through-channel in a solid body, such as a hot runner, which includes the steps of:

(1) providing at least two solid blocks which have complementary side faces and which are together sufficiently large to form the body,
(2) forming corresponding grooves in the side faces of the solid blocks,
(3) placing the side faces of the solid blocks together such that the grooves together bound a channel,
(4) coupling of the blocks into a body, and
(5) passing a liquid abrasive agent with force through the channel for a certain period of time in order to modify the channel into a desired rheological form through honing, which honing may be pulsating.

8 Claims, 2 Drawing Sheets

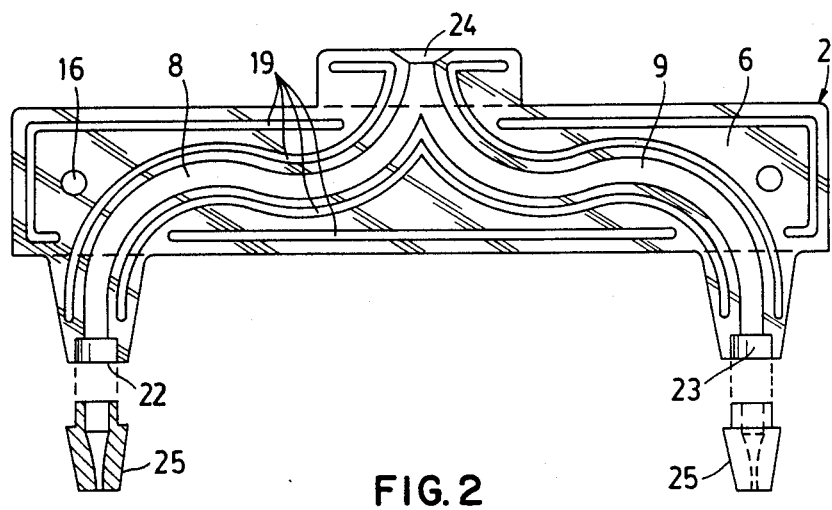
FIG. 2
FIG. 3
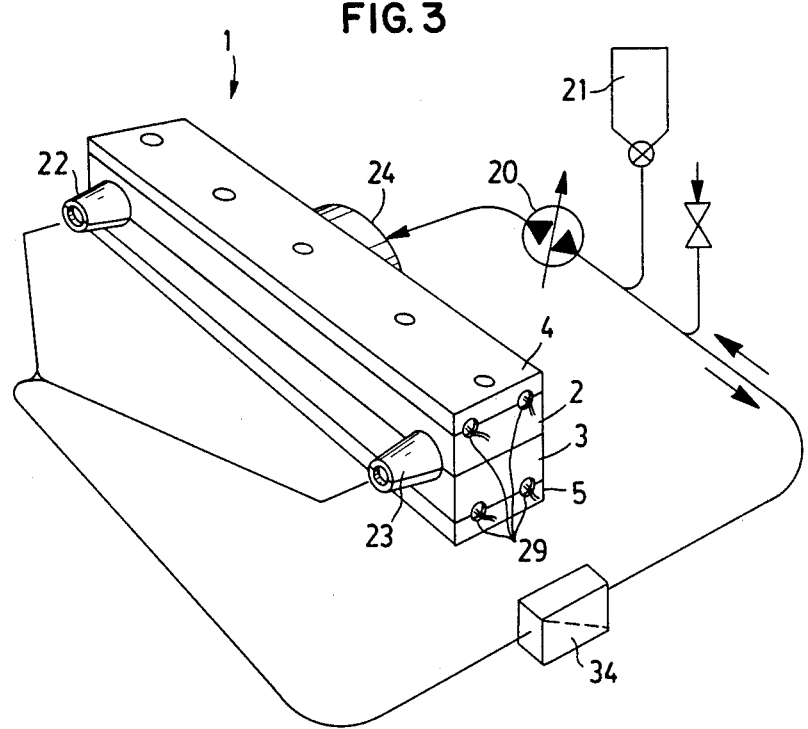

METHOD FOR ARRANGING A THROUGH-CHANNEL IN A SOLID BODY, AND THE BODY OBTAINED WITH THIS METHOD

BACKGROUND AND SUMMARY OF THE INVENTION

The invention relates to a method for arranging at least one through-channel in a solid body.

An example of a solid body of this type is a hot-runner, that is, a component for use in combination with an injection moulding device, which component comprises at least one channel for passage of heated plastic to the mould cavity of an injection moulding die. A single hot-runner comprises only one channel which is generally straight and which if required may possess a slightly tapering form. Such a channel can be obtained simply by drilling. For injection moulded products with a more complicated structure or for products which have to satisfy high quality control requirements, for instance compact discs, FLDs, NODs and other optical information carriers, the injection moulded product usually has to be manufactured via multiple gates. Use has to be made for this purpose of a hot-runner with one inlet opening which branches into a number of channels which each run out on the other side of the hot-runner. As will be apparent, these channels have to possess a form that is out of straight. In accordance with the known art, they are arranged in a block by way of a number of external bore machinings, followed where necessary by the re-filling of material portions where drilling out has been excessive.

The drawback of these steps is that the smoothness of the channels is difficult to control, that blind spots cannot be avoided when the heated plastic flows through the channels during an injection moulding process, and that the rheological characteristics of the channels generally leave something to be desired. This implies that the products obtained with the known art are capable of improvement.

The invention has for its object to offer a method of the type described can provide, which a considerable improvement in the quality of high grade injection moulded products. To this end the method comprises the following steps:
(1) providing at least two solid blocks which are together sufficiently large to form the body,
(2) complementary modelling where required of corresponding side faces of the blocks,
(3) forming a groove in each of the side faces, which pairs of grooves possess corresponding forms,
(4) placing the noted side faces against each other such that the grooves together bound a channel, and
(5) coupling the blocks into a body.

This method is preferably succeeded by the following step:
(6) passing a liquid abrasive agent with force through the channel for a certain period of time in order to render the channel into a desired rheological form through honing, which honing may be pulsating.

Both blocks can be unified into a body by any desired technique. In the case of injection moulding devices however, very high pressures occur, so that joining by means of bolts for example cannot be considered. Recommended is the method whereby the blocks are unified into a body by vacuum soldering.

Of great importance in determining the required rheological form is the interval of time during which the liquid abrading agent has to be passed through in the so-called "slurry-honing". This can be effected by way of the following steps:
(7) manufacturing a number of bodies, each with a different time interval,
(8) establishing which body has a channel complying best with the required rheological form, and
(9) determining the noted time interval of that body.

It should be understood that as a result of the passing of a liquid abrading agent through the body, a gradual abrasion of the wall of the or each channel occurs, whereby at a certain point in time the "ideal" rheological characteristics are obtained.

The above specified step (8) can now be performed by:
(10) dividing the body into blocks in lengthwise direction along a sectional plane of the channel and establishing the form of the thus formed grooves forming the channel in the original body.

In the case where the body to be manufactured is a hot-runner, the above specified step (8) can be performed by:
(11) successive accommodation of the hot-runners in the injection moulding device,
(12) the manufacturing at least one injection moulded object, for example a compact disc, with each of these hot-runners, and
(13) establishing with which hot-runner the best object has been manufactured.

For example, in the case of optical information carriers that are manufactured from high grade and very transparent plastic, establishing which of the objects produced is the best can be carried out by determining the optical properties, this being done at a number of places on the formed injection moulded product.

Finally, the invention relates to a solid body with at least one through-channel obtained by application of a method according to the invention of the type discussed above.

BRIEF DESCRIPTION OF THE DRAWINGS

The invention will now be elucidated with reference to the accompanying drawings. In the drawings:

FIG. 2 is a view along the line II—II of a coupling plane of a hot-runner as in FIG. 1, with the associated injection nozzles; and FIG. 3 shows a schematic perspective view of a hot-runner, the channels of which are optimised by means of slurry-honing.

DETAILED DESCRIPTION OF THE PREFERRED EMBODIMENT

Figure 1:
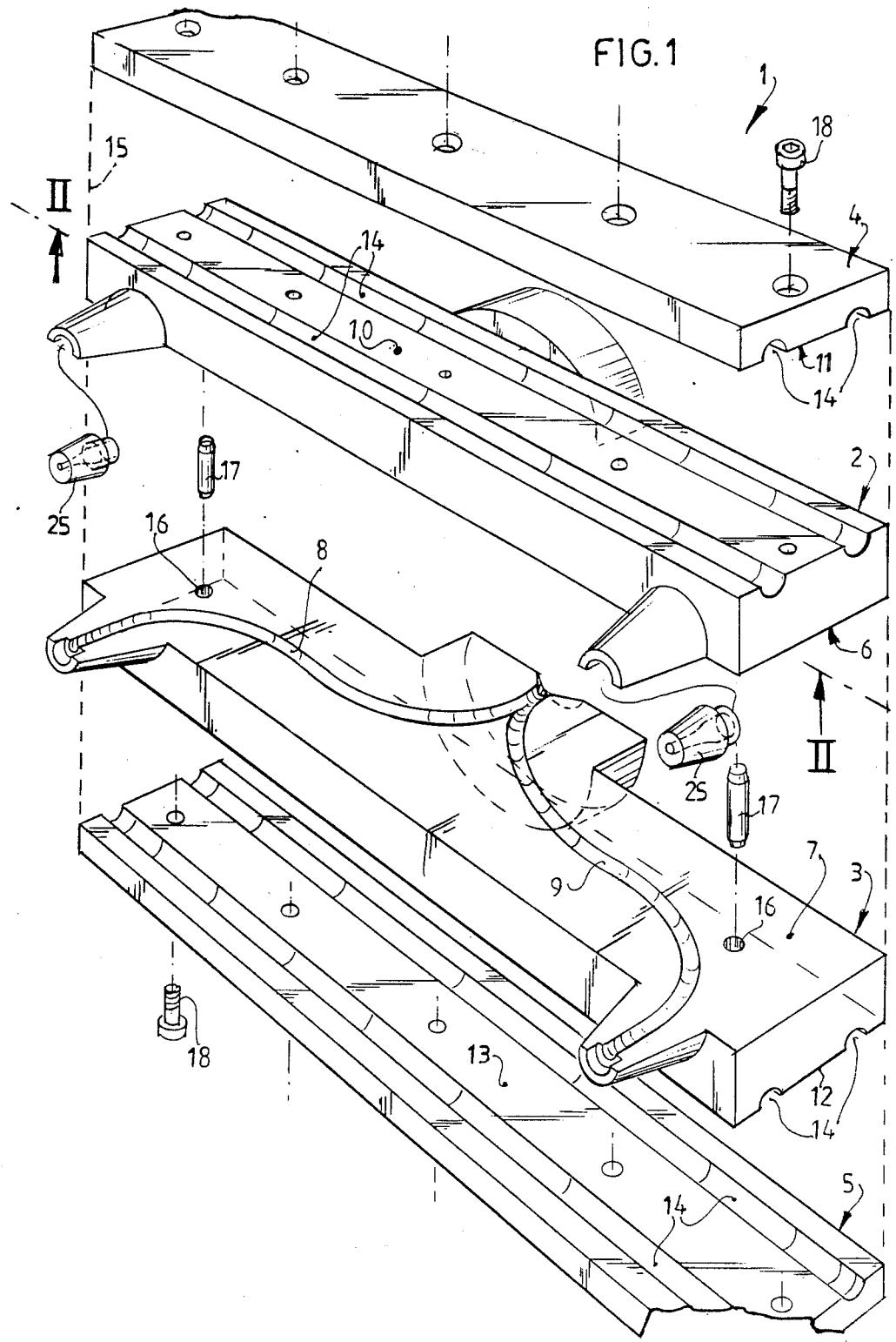
FIG. 1 shows an exploded view of a hot-runner in twofold form.

FIG. 1 shows an exploded view of a hot-runner 1. This hot-runner 1 comprises two solid blocks 2, 3, which each consists of two parts, 2, 4; 3, 5, respectively. The solid blocks 2, 3 display in this case surfaces 6, 7 to be set facing each other which are provided with grooves 8, 9 in a milling process. Grooves 8, 9 together form, in the case where the surfaces 6, 7 are placed onto each other, the bounding of through-channels. The second parts 4, 5, together with the respective blocks 2, 3, likewise bound straight channels for the accommodation of heating elements. For this purpose grooves are cut into the surfaces 10, 11 and 12, 13 facing each other, for example by milling, all these grooves being designated with 14 for the sake of convenience.

The hot-runner 1 is assembled from the components in the manner indicated in FIG. 1 with broken lines 15. Accurate positioning is obtained by means of holes 16 and positioning pins 17. This ensures the most accurate possible joining of the edges of the grooves 8. Such a precise connection is of importance with respect to the desired accuracy of the streamline form of the channels bounded by the grooves 8, 9.

The blocks 2, 3 consist of a material suitable for a hot-runner, for instance a high quality tool steel. The surfaces 6, 7 are given a plane form with a high degree of precision. The grooves 8, 9 are arranged in the block on the surfaces 6, 7 by a milling process.

The parts 2, 4 and 3, 5 are connected to each other by means of screws 18 after heating elements 29 have been placed in the channels bounded by grooves 14, as shown in FIG. 3.

FIG. 2 shows the smooth surface 6 of the block 2, wherein the grooves 8, 9 are arranged by means of milling. Located on either side of grooves 8, 9 and on the side edges of the surface 6 are vacuum-soldering zones 19. Present in these zones are nickel, copper, beryllium or other suitable metal which, through eddy-current heating in vacuum with the surfaces 6, 7 lying against each other, give an exceptionally strong adhesion between these surfaces 6, 7. The vacuum-soldering technique is generally known and requires no further discussion within the framework of this invention.

The vacuum-solder zones can comprise paste, wire or foil of the relevant material, or also combinations thereof.

After the whole hot-runner 1 has been assembled in the above described manner, an improvement of the streamline form, that is, the rheological characteristics of the channels bounded by the grooves 8, 9, can if required by realized by an arrangement as shown in FIG. 3. As in this very schematically drawn disposition a liquid abrading agent, generally denoted as abrasive slurry and originating from a storage tank 21, can be pressed through the channels of hot-runner 1 bounded by the grooves 8, 9 by means of a regularly reversing pump 20.

This per se known honing technique gives, in the context of the invention, the specific advantage that the streamline form of the channels present in a solid body is improved in very simple manner, and as it were automatically.

The outlets 22, 23 of the channels are connected via a filter 34 to the pump 20 which is connected on the other side to the inlet 24. The pulsating action pump 20 pumps for a period to be specifically determined the abrasive slurry with force back and forth through the channels bounded by grooves 8, 9.

After completion of the hot-runner 1, injection nozzles 25 are coupled to the outlets 22, 23. Via these injection nozzles the heated and therefore softened plastic is injected into the mould cavity of the injection moulding die.

The invention offers a method which can be performed in very simple manner for arranging in a solid block channels of which the characteristics can be kept under very close control. A better controlled injection moulded product can therefore be obtained, since the degree of filling and the temperature distribution of the plastic in the mould cavity is better kept under control.

It will be apparent that the invention is not restricted to hot-runners but extends in general to metal blocks with channels, the form of which is determined only with difficulty or not at all by simple processes such as drilling or milling, and the flow characteristics of which are of essential importance.

The method according to the invention is not limited to configurations of channels extending in a common main plane, but also readily practicable for more complex, e.g., spatial, configurations.

I claim:

1. A method for providing a through-channel having a desired rheological form in a solid body, said method comprising the steps of:
   (a) providing a plurality of solid blocks which have respective side faces that complement one another and which together can form the solid body,
   (b) forming respective grooves in the side faces of the solid blocks, said grooves having corresponding forms,
   (c) placing said solid blocks together such that the side faces thereof abut one another and the grooves therein cooperate to define a through-channel,
   (d) coupling said solid blocks so as to provide the solid body containing a through-channel, and
   (e) forcibly passing a liquid abrading agent through the through-channel for a predetermined time period sufficient to not only smooth the grooves defining the through-channel by honing, but additionally to change the configuration of the through-channel and provide it with the desired rheological form.

2. A method as claimed in claim 1, wherein in step (e) said liquid abrading agent is reciprocatingly forced through the through-channel.

3. A method as claimed in claim 1, wherein step (d) is performed by vacuum soldering.

4. A method as claimed in claim 1, wherein said predetermined time period is determined by the steps of:
   (f) providing a plurality of solid blocks which have respective side faces that complement one another and which together can form the solid body,
   (g) forming respective grooves in the side faces of the solid blocks, said grooves having corresponding forms,
   (h) placing said solid blocks together such that the side faces thereof abut one another and the grooves therein cooperate to define a through-channel,
   (i) coupling said solid blocks so as to provide a solid body containing a through-channel,
   (j) repeating steps (f)–(i) so as to provide a plurality of solid bodies having identical through-channels,
   (k) forcibly passing said liquid abrading agent through the through-channels in the respective solid blocks for different time periods, and
   (l) determining which one of the plurality of solid blocks has a through-channel with a desired rheological form, the time period that liquid abrading agent passed through the through-channel therein being said predetermined time period.

5. A method as claimed in claim 4, wherein step (l) is accomplished by dividing each of the plurality of solid blocks in a lengthwise direction along a sectional plane of the through-channel therein and inspecting the form of the grooves defining each of the through-channels.

6. A method as claimed in claim 4, wherein said plurality of solid bodies can be used to form products, and wherein step (l) is accomplished by using each of said plurality of solid blocks to form a product and then determining which product is best, the solid body used to form said best product having a through-channel with the desired rheological form.

7. A method as claimed in claim 6, wherein said solid bodies are hot-runners for use in an injection molding machine.

8. A method as claimed in claim 7, wherein said products are compact discs formed in said injection molding machine.

* * * * *